(12) United States Patent
Johnson et al.

(10) Patent No.: US 8,140,323 B2
(45) Date of Patent: Mar. 20, 2012

(54) METHOD AND SYSTEM FOR EXTRACTING INFORMATION FROM UNSTRUCTURED TEXT USING SYMBOLIC MACHINE LEARNING

(75) Inventors: David E. Johnson, Cortlandt Manor, NY (US); Frank J. Oles, Peekskill, NY (US)

(73) Assignee: International Business Machines Corporation, Armonk, NY (US)

( * ) Notice: Subject to any disclaimer, the term of this patent is extended or adjusted under 35 U.S.C. 154(b) by 187 days.

(21) Appl. No.: 12/507,866

(22) Filed: Jul. 23, 2009

(65) Prior Publication Data

US 2009/0287476 A1  Nov. 19, 2009

Related U.S. Application Data

(63) Continuation of application No. 10/979,162, filed on Nov. 3, 2004, now abandoned.

(60) Provisional application No. 60/586,877, filed on Jul. 12, 2004.

(51) Int. Cl.
- G06F 17/20 (2006.01)
- G06F 17/27 (2006.01)
- G06F 17/21 (2006.01)

(52) U.S. Cl. .................. 704/9; 704/1; 704/10; 715/256; 706/46; 706/55

(58) Field of Classification Search .................. 715/256; 704/1, 9, 10; 706/45, 55

See application file for complete search history.

(56) References Cited

U.S. PATENT DOCUMENTS

| | | | |
|---|---|---|---|
| 5,519,608 A | 5/1996 | Kupiec | |
| 5,864,788 A | 1/1999 | Kutsumi | |
| 5,963,742 A | 10/1999 | Williams | |
| 6,246,977 B1 | 6/2001 | Messerly et al. | |
| 6,556,983 B1 | 4/2003 | Altschuler et al. | |
| 6,675,159 B1 * | 1/2004 | Lin et al. | 704/9 |
| 6,901,402 B1 * | 5/2005 | Corston-Oliver et al. | 1/1 |
| 7,003,445 B2 | 2/2006 | Humphreys et al. | |
| 7,191,119 B2 | 3/2007 | Epstein et al. | |
| 7,219,054 B1 * | 5/2007 | Begeja et al. | 704/231 |
| 7,249,117 B2 | 7/2007 | Estes | |
| 7,440,890 B2 * | 10/2008 | Proux | 704/9 |
| 2002/0169596 A1 | 11/2002 | Brill et al. | |
| 2003/0144978 A1 | 7/2003 | Zeine | |
| 2003/0212544 A1 | 11/2003 | Acero et al. | |
| 2004/0044519 A1 | 3/2004 | Polanyi et al. | |
| 2004/0111253 A1 | 6/2004 | Luo et al. | |
| 2004/0176945 A1 * | 9/2004 | Inagaki et al. | 704/4 |
| 2004/0205482 A1 * | 10/2004 | Basu et al. | 715/500.1 |
| 2004/0220797 A1 | 11/2004 | Wang et al. | |
| 2004/0243394 A1 | 12/2004 | Kitamura | |

OTHER PUBLICATIONS

Oles, Frank. "Categories of Patterns Relevant to Relational Learning." IBM Research Report. RC 22622, Jan. 15, 2002, pp. 1-17.*

Oles, Frank. "Precedence-Inclusion Patterns: A Fresh Approach to Relational Learning." IBM Research Report. RC 22312, Jan. 21, 2002, pp. 1-15.*

(Continued)

*Primary Examiner* — Paras Shah
(74) *Attorney, Agent, or Firm* — McGinn IP Law Group, PLLC

(57) ABSTRACT

A method (and structure) of extracting information from text, includes parsing an input sample of text to form a parse tree and using user inputs to define a machine-labeled learning pattern from the parse tree.

16 Claims, 10 Drawing Sheets

OTHER PUBLICATIONS

Anderson, C. R., Domingos, P., and Weld, D. S. 2002. Relational Markov models and their application to adaptive web navigation. In Proceedings of the Eighth ACM SIGKDD international Conference on Knowledge Discovery and Data Mining (Edmonton, Alberta, Canada, Jul. 23-26, 2002). KDD '02. ACM, New York, NY, 143-152.*

Oles, Frank. "Patterns Based on Multiple Interacting Partial Orders." IBM Research Report. RC22770, Apr. 9, 2003, pp. 1-2.*

Oles, FRank. "Precedence-Inclusion Patterns and Relational Learning." DIMACS Workshop on Applications of Lattices and Ordered Sets to Computer Science, slides 1-38, Jul. 9, 2003.*

Zelle, John and Raymond J. Mooney. An inductive logic programming method for corpus-based parser construction Unpublished Technical Report, pp. 1-58, 1997.

Amoth, T. R. Cull, P. and Tadepalli, P. 1998. Exact learning of tree patterns from queries and counterexamples. In Proceedings of the Eleventh Annual Conference on Computational Learning theory. (Madison, Wisconsin, United States, Jul. 24-26, 1998). COLT '98. ACM, New York, NY, 175-186. DOI=http://doi.acm.org/10.1145/279943.279980.

Martin Grohe and Gyorgy Turan. Learnability and definability in trees and similar structures. Theory of Computing Systems 37 (2003) 193-220.

* cited by examiner

Input sentence: Carlson acquired Ask Mr Foster in 1979. —301

Named Entities Identified: /—302
<ne lex="propn ORGANIZATION"> Carlson </ne> acquired <ne lex="propn ORGANIZATION"> Ask Mr Foster </ne> in <ne lex="n tm DATE"> 1979 </ne>.

English Slot Grammer (ESG) Parse:
<ph id="2" slot="top" f="verb vfin vpast sg vsubj">
  <ph id="1" slot="subj(n)" f="noun propn sg ORGANIZATION">
    <hd w=" Carlson " c=" Carlson " s=" Carlson " a=""/>
  </ph>
  <hd w="acquired" c="acquire" s="acquire1" a="1,3"/>
  <ph id="3" slot="obj(n)" f="noun propn sg ORGANIZATION">
    <hd w=" Ask Mr Foster " c=" Ask Mr Foster " s=" Ask Mr Foster " a=""/>
  </ph>
  <ph id="4" slot="vprep" f="prep staticp timepp">
    <hd w="in" c="in" s="in1" a="5"/>
    <ph id="5" slot="objprep(n)" f="noun cn sg advnoun tm DATE">
      <hd w="1979 " c=" 1979 " s=" 1979 " a=""/>
    </ph>
  </ph>
</ph>

FIG.3

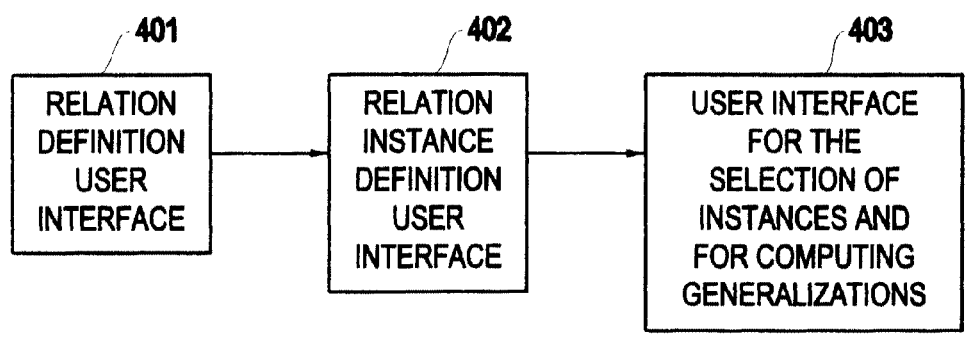

Executive Change Relation Demo — 500

Problem Set-up | Instance Definition | Select & Learn | Apply to Text

Parsed Text Items (Click on One to Select It): — 501, 502

43: The company is a provider of automated cell-imaging systems and manufacturer of the ACIS systems.
44: First Midwest Bancorp Names CFO.
45: Michael L. Scudder, currently serving as executive vice president and chief financial officer of First Midwest Bank, has been names as chief financial officer of First Midwest Bancorp, Inc.
46: Fannie Mae Names Mudd vice Chairman And COO.
47: Daniel H. Mudd, previously serving as president and chief executive officer of GE Capital, Japan, has been named as vice chairman and chief operating officer of Fannie Mae/(NYSE-FNM) of Washington, D.C.
48: Fannie Mae is a New York Stock Exchange company and the largest non-bank financial services company in the world.
49: Soundbreak.com Names CEO.
50: Lisa Z Crane, previously serving as general manager of NBC.com and vice president of NBC Interactive, has been named as president and chief executive officer of Soundbreak.com, a subsidiary of Acacia Research Corporation(NASDAQ-ACRI) of Pasadena, California.
51: The company has developed a dynamic music website that fuses the live entertainment value of radio with the power of the Internet.
52: William R. Graber, previously serving as vice president and chief financial officer of The Mead Corporation, has been named as senior vice president and chief financial officer of McKesson HBOC, Inc./(NYSE-MCK) of San Francisco, California.
53: The company is the world’s largest supply management and healthcare information technology company.
54: Cooper Industries Names Levos Controller.
55: Jeffery B. Levos, previously serving as vice president, controller and chief accounting officer of The Coastal Corporation, has been named as vice president and controller of Cooper Industries, Inc./(NYSE-CBE) of Houston, Texas.
56: The company is a worldwide manufacturer of electrical products, tools and hardware.
57: In Home Health Appoints CEO.
58: C. Michael Ford, owner and chairman of the board of Montpelier Corporation, has been appointed as chairman, interim president and chief executive officer of In Home Health, Inc./(NASDAQ-IHH) of Minnetonka, Minnesota.

Token List for Selected Text Item.
(Click on a Token to Select It and the Phrase Headed by the Token.)

William R. Graber previously serving as vice president and chief financial officer of the Mead Corporation has been named as senior vice president and chief financial officer of McKesson HBOC, Inc./NYSE-MCK of San Francisco, California — 503

| Clear Token/Phrase Selection in Selected Text Item. | Save Selected Text Item as the Reference Example. | View the Saved Reference Example. | — 504 |

Relation Name: ExecutiveChange (5 Slots)
Define Relation Instance in Selected Text Item.
(Click Button to Toggle Its Slot Filler between Selection from Token List Above and UNDEFINED.)

| | Person | William R. Graber |
|---|---|---|
| Head Only | Previous Position | vice president and chief financial officer |
| Head Only | Previous Company | Mead Corporation |
| Head Only | New Position | senior vice president and chief financial officer |
| Head Only | New Company | McKesson HBOC |

Type Name Below for This Relation Instance & Hit Return to Save It.

| Graber Appointment | Clear Entries on This Screen. |

METHOD AND SYSTEM FOR EXTRACTING INFORMATION FROM UNSTRUCTURED TEXT USING SYMBOLIC MACHINE LEARNING

CROSS-REFERENCE TO RELATED APPLICATIONS

The present Application is related to U.S. Provisional Patent Application No. 60/586,877, filed on Jul. 12, 2004, to Johnson et al., entitled "System and Method for Extracting Information from Unstructured Text Using Symbolic Machine Learning", assigned to the present assignee, and incorporated herein by reference.

The present Application is also a Continuation Application of U.S. patent application Ser. No. 10/979,162, filed on Nov. 3, 2004 now abandoned, which is also incorporated herein by reference.

BACKGROUND OF THE INVENTION

1. Field of the Invention

The present invention generally relates to extracting information from text. More specifically, in a relational learning system, a pattern learner module receives a small number of learning samples defined by user interactions in relational pattern templates format wherein elements are defined in a precedence relation and in an inclusion relation, and calculates a minimal most specific generalization (MMSG) for these samples so that information matching the generalized template can then be extracted from unseen text.

2. Description of the Related Art

Extracting relational information from text is an important and unsolved problem in the area of Unstructured Information Management. Many applications including search, question answering, and combining unstructured and structured information could benefit from accurate extraction of relational information.

The present invention deals with learning to recognize patterns in text (training data) that characterize the presence of a kind of information in the training data and applying the learned patterns to extract similar kinds of information from new text (unseen text). In particular, the present invention deals with learning to recognize patterns that characterize when a particular relation exists between textual elements, mentions of named entities, or phrases that are present in text. This type of learning from text is sometimes called 'relational learning'.

Each specific occurrence of a relation is termed a "relation instance". Often, of particular interest is a relation that describes a kind of event that has occurred, that is occurring or that will occur. In the setting of a relation that describes a kind of event, a relation instance may be termed an "event mention".

For instance, from a sentence such as "Jack Jones was appointed CEO of XYZ Corp last week", a relational learning system might extract the relational information: [Relation: Appoint, Appointee: "Jack Jones", Role: "CEO of XYZ Corp"].

From this example, it can be understood that relational learning involves a defined "relation" that includes one or more "parameters" that fit into the relation "template". In the example, "Jack Jones" is the "Appointee" and "CEO of XYZ Corp" is the "Role". "Appointee" and "Role" are the argument names of the "Appoint" relation. It should also be noted that the template implies a relationship between the arguments, such as the order of the argument or the interconnection understood by a word or sentence structure, such as a verb or prepositional phrase relationship. The significance of determining this relationship will become apparent as the present invention is further described, since the inventors have recognized that a mere ordering of tokens is insufficient for effective information extraction.

As an exemplary scenario for which the present invention might be used is one in which a user (exemplarily, a non-specialist) wishes to search a database or perhaps the Internet to find data items that, for example, identify CEOs of corporations.

Basically, there are currently two main approaches for this relational learning problem:

(1) manual development of patterns; and
(2) learning patterns using machine learning techniques.

Manual approaches are very costly to develop, since they require experts in computational linguistics or related disciplines to develop formal grammars or special purpose programs. Non-specialists cannot customize manual systems for new domains, tasks or languages.

Machine learning approaches fall into two classes:

(i) statistical approaches; and
(ii) symbolic approaches.

Machine learning approaches have the advantage that they require only labeled examples of the information sought. Statistical methods are quite popular, but they suffer from the problem of labeling sufficient data accurately for training a model. This is a major problem for such approaches.

Moreover, as the relations of interest vary from task to task and even from individual to individual, methods are needed to learn how to extract relations of interest on demand. Further, it would be desirable that non-specialists be able to use the relational learning tool.

There are currently no adequate solutions to the problem of trainable relation extraction systems, especially no adequate systems that can be used by non-specialists.

Thus, a need continues for a method and system that, as relations of interest vary from task to task and even from individual to individual, learn how to extract relations of interest on demand. Further, it would be desirable that non-specialists be easily able to use a relational learning system.

SUMMARY OF THE INVENTION

In view of the foregoing, and other, exemplary problems, drawbacks, and disadvantages of the conventional system, it is an exemplary feature of the present invention to provide a system and method for developing learning patterns that can then be used to automatically extract relations from text.

It is another exemplary feature of the present invention to provide a technique that can be used by non-specialists.

It is another exemplary feature of the present invention to provide a method that allows a user with no special knowledge of linguistics to dynamically define patterns on the basis of a small number of example sentences or pseudo-examples in which the user has marked those named entity mentions that are involved in a relation instance. The defined patterns can then be used to identify relation instances in hitherto unseen sentences with high precision.

It is another exemplary feature of the present invention to provide a method in which only a few samples are needed to define a relation pattern for use in searching for similar patterns, including the case in which a single learning sample can be used.

To achieve the above exemplary features and others, in a first exemplary aspect of the present invention, described herein is a method (and structure) of extracting information from text, including parsing an input sample of text to form a parse tree and receiving user inputs to define a machine-labeled learning pattern from the parse tree.

In a second exemplary aspect of the present invention, described herein is an apparatus for relational learning, including a generator for developing a precedence inclusion (PI) pattern of a learning sample wherein elements in said learning sample are machine-labeled to define a precedence relation and an inclusion relation.

In a third exemplary aspect of the present invention, described herein is a signal-bearing medium tangibly embodying a program of machine-readable instructions executable by a digital processing apparatus to perform a method of relational learning, the machine-readable instructions including a precedence inclusion (PI) pattern learning module for generating a PI pattern of a learning sample wherein elements in said learning sample are machine-labeled to define a precedence relation and an inclusion relation.

In a fourth exemplary aspect of the present invention, also described herein is a method of searching unseen text, the method including at least one of conducting a search of unseen text by developing a precedence inclusion (PI) pattern of at least one learning sample and using the PI pattern for comparison with unseen text and providing a computerized tool to a user for conducting the search.

Thus, the present invention provides an improved method for relational learning in which a non-specialist can intuitively use the tool that embodies this method to develop a PI pattern template to be used for comparison with unseen text.

BRIEF DESCRIPTION OF THE DRAWINGS

The foregoing and other exemplary features, aspects and advantages will be better understood from the following detailed description of an exemplary embodiment of the invention with reference to the drawings, in which:

FIG. 3 shows an example of an actual output display of the Linguistic Analyzer 101;

FIG. 4 illustrates a block diagram 400 of the PI Pattern Applier 106;

FIG. 5 illustrates an exemplary screen shot 500 from a demonstration system that illustrates the defining of a relation instance;

FIG. 6 illustrates an exemplary screen shot 600 from a demonstration system that illustrates the learning of a PI pattern;

DETAILED DESCRIPTION OF EXEMPLARY EMBODIMENTS OF THE INVENTION

Figure 1:
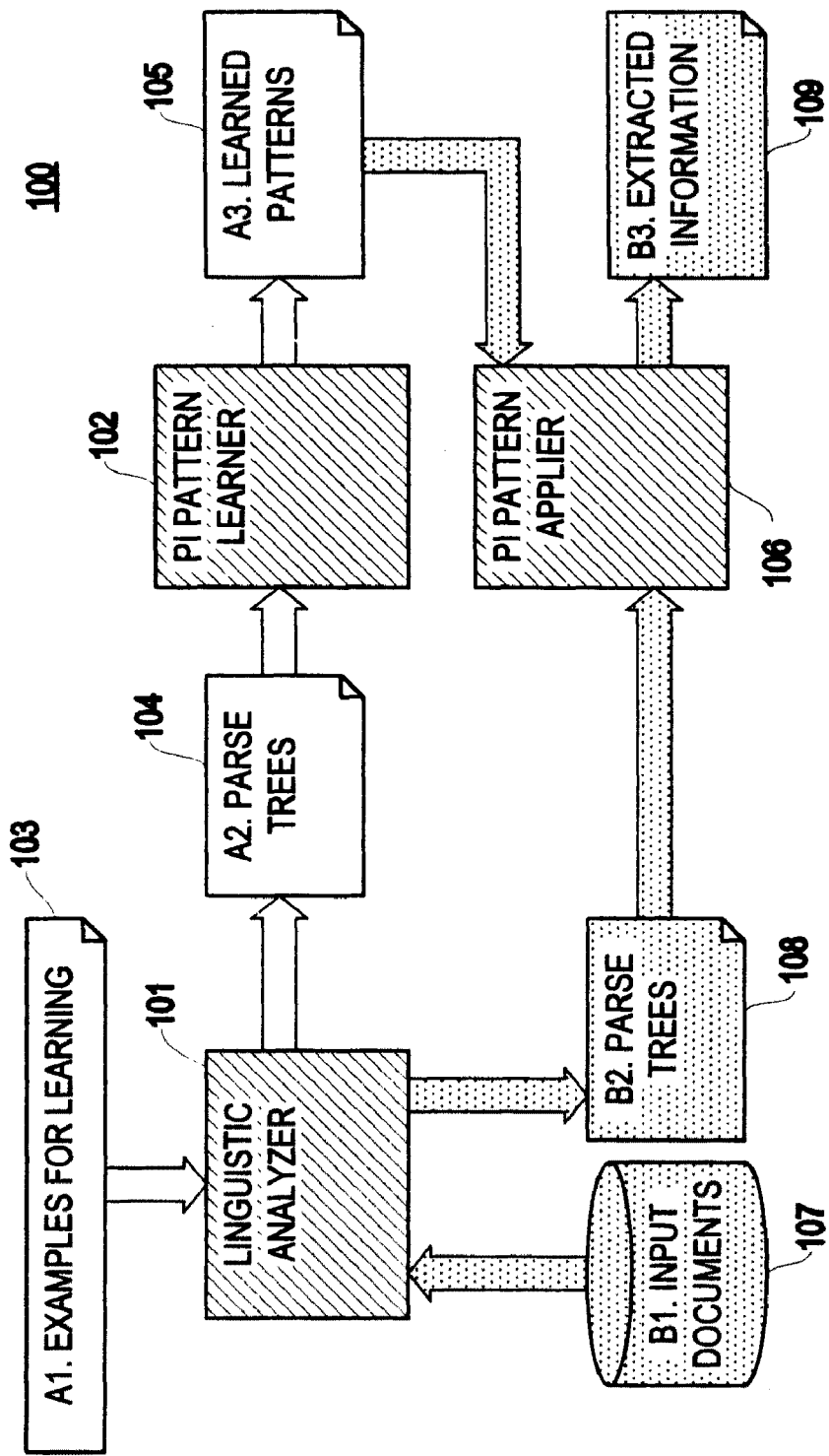
FIG. 1 illustrates an overview block diagram of an exemplary embodiment 100 of the present invention.

Referring now to the drawings, and more particularly to FIGS. 1-12, exemplary embodiments of the present invention will now be described.

Machine learning approaches have the advantage that they require only labeled examples of the information sought. Much recent work on relational learning has been statistical. One such approach that reflects the state of the art for statistical methods is "Kernel Methods for Relation Extraction" by D. Zelenko, C. Aone, and A. Richardella, where the learning is of a function measuring similarity between shallow parses of examples. Statistical methods, in particular, need to have a large amount of labeled training data before anything useful can be done. This is a major problem for statistical approaches.

Work in another vein has concerned various attempts to accomplish relational learning by using heuristics to learn finite state recognizers or regular expressions, as exemplified by "Learning Information Extraction Rules for Semi-Structure and Free Text", by S. Soderland.

Finally, the automatic construction of rule-based systems, such as the RAPIER system described in "Relational Learning of Pattern-Match Rules for Information Extraction" by M. Califf and R. Mooney, has been attempted.

In contrast, as described in the following discussion concerning the overview in FIG. 1 of an exemplary embodiment, the symbolic approach of the current invention is capable of generalizing from a small number of examples (positive cases) and naturally lends itself to an iterative, interactive learning approach.

That is, in an interactive approach, a user might use the tool of the present invention to select a few data as learning samples, use the tool of the present invention to generalize these learning samples, test its performance, and, if desirable, pick additional samples to improve the learning and thereby improve performance. Thus, the current system and method are dynamic.

As mentioned, in contrast to conventional methods, the present invention can use only a few samples for the initial learning. An example is given below in which only two learning samples are used. It is noted that the tool performs even when only a single learning sample is used, even though a single sample does not fit as neatly into the underlying mathematical theory. However, the tool is still capable of handling this special case of a single learning sample. In this special case, the tool heuristically generalizes components for the parameters, such as names, locations, dates, etc., for the single pattern. However, in general, it would reasonably be expected that performance would improve as more learning samples are added, particularly relative to being able to provide a more precisely-defined search template.

This learning approach, together with the other aspects of the invention, means that a non-expert can use the system and method for learning patterns, simply by providing some examples and indicating which information in the examples should be extracted and what, if anything, the pieces of information should be labeled.

It can be said that the present invention is based on the marriage of deep parsing with a new theory of symbolic pattern generation and, therefore, has a different technical basis from the approaches discussed above. It contrasts sharply with all of the above approaches in that it is based on learning from small sets of sentences that a person would judge to be similar to one another.

Moreover, it will readily recognized that the approach of the present invention is tailored directly to the vision of the analyst defining the information extraction and the analyst's dynamic needs, in a setting where all the linguistics, computer science, and mathematics are kept under the table (e.g., transparent) so that a non-specialist user can easily and intuitively provide the steps necessary for the preliminary learning phase.

The present invention employs the new mathematical theory of precedence-inclusion patterns as the means of learning patterns from a small number of relation instances. These patterns are based on parsed text in which named entity mentions are machine-labeled. The patterns so defined are then applied to other hitherto unseen sentences to find new relation instances with high precision. This new type of symbolic pattern generalization (machine learning) algorithm is used in conjunction with a general purpose parser that produces parse trees of sentences.

An overview of the process 100 is shown in FIG. 1 to demonstrate an exemplary embodiment of the present invention. The process 100 can be broken into two phases, the upper-level phase $A_i$ learning process (e.g., A1, A2, A3), and the lower-level phase $B_i$ application process (e.g., B1, B2, B3).

In the first phase A, each sample sentence for the preliminary learning process is sequentially used as the basis of defining a machine-labeled relation representing that sample sentence. In this step, a user interacts with the linguistic analyzer 101 in a process that includes individually parsing a small number of examples 103 into parse trees 104, components of which are then provided as inputs into PI pattern learner 102 to generate learning (learned) patterns 105.

In the second phase B, the learned patterns 105 then become input patterns into PI Pattern Applier 106. Input documents from data source 107 are then individually evaluated by the linguistic analyzer 101, which forms a parse tree 108 of each unseen text document or sentence, which then is compared with the generalization of the learned patterns 105. The output, the extracted information 109, are unseen text documents that match the pattern of the generalization of the learned patterns 105.

In an exemplary embodiment shown in FIG. 1, the system also uses a named entity detector to chunk and label names of things, such as people, places, dates, times, monetary amounts, occupations, positions, and organizations, in conjunction with a general parser for the language of interest. The named entity chunking phase reduces the complexity of the parse tree and provides useful class labels for key arguments, such as, in the exemplary scenario, Person, Place, and Organization.

Using a general parser means that the syntactic analysis phase of the system does not have to be manually constructed or altered for particular domains or tasks. However, in principle, the invention could be used without a named entity recognition phase, and it could be used with a specialized parser or a partial parser that does not produce complete parses of sentences.

More specifically, in the present invention, given a set of parse trees of, presumably, related sentences (e.g., the learning samples 103), the new symbolic pattern generalization algorithm determines, in a mathematically precise sense, the most specific generalization of the set of trees, and this generalization can then be applied to other parse trees (e.g., parse trees 108) to determine if any of are instances of the learned generalization.

In addition, by associating pieces of information in the example sentences with elements in a relation or template, the system them can extract the corresponding information from matched trees. The specific type of structures used in the present invention is original, as is the method of generalization. Specifically, the structures learned (so-called "precedence inclusion patterns") are more general than trees, which are the structures commonly used in computational linguistics.

In the state of the art, a generalization of a set of trees is also a tree (e.g., a more general tree). In contrast, within the theory applied here, the generalization of a set of trees, represented as precedence-inclusion patterns, is not, in general, a tree. This generality has practical implications for the invention, as described in the detailed material below, in that a "best generalization" (e.g., a Minimal Most Specific Generalization (MMSG)) is generated for the learned structures. In contrast, other approaches to symbolic generalization are ad hoc in that there is no formal notion of a best generalization.

That is, the present inventors consider that parse trees by themselves, as currently conceived, are, from a technical point of view, seriously deficient as a basis for learning patterns of linguistic constituents of sentences from small numbers of examples. The problem is that, in general, there is no constituent structure tree that functions as a mathematically well-defined "best generalization" of a finite set of constituent structure trees.

To overcome this deficiency, the present invention is based on the mathematical theory of precedence-inclusion patterns, as discussed in the above-referenced Provisional Application No. 60/586,877, the contents of which are hereby incorporated by reference.

As stated above, other known approaches to symbolic generalization are ad hoc, in that there is no formal notion of a "best generalization." In contrast, the approach of the present invention is very general, lending itself to learning over many types of structures: full parse trees, partial parses. Indeed, patterns can be generalized across sentences. The approach has been implemented and another key part of the invention deals with the efficient implementation of the generalization process.

Another non-limiting example of varying the embodiment shown in FIG. 1 includes using heuristic ways to improve the practical utility of the algorithms in an application. As non-limiting examples, synonym sets or online resources, such as WordNet, or ontologies, or other techniques from computational linguistics can be used, which, when combined with the fundamental algorithms of the present invention, can result in improved generalization performance.

Figure 2:
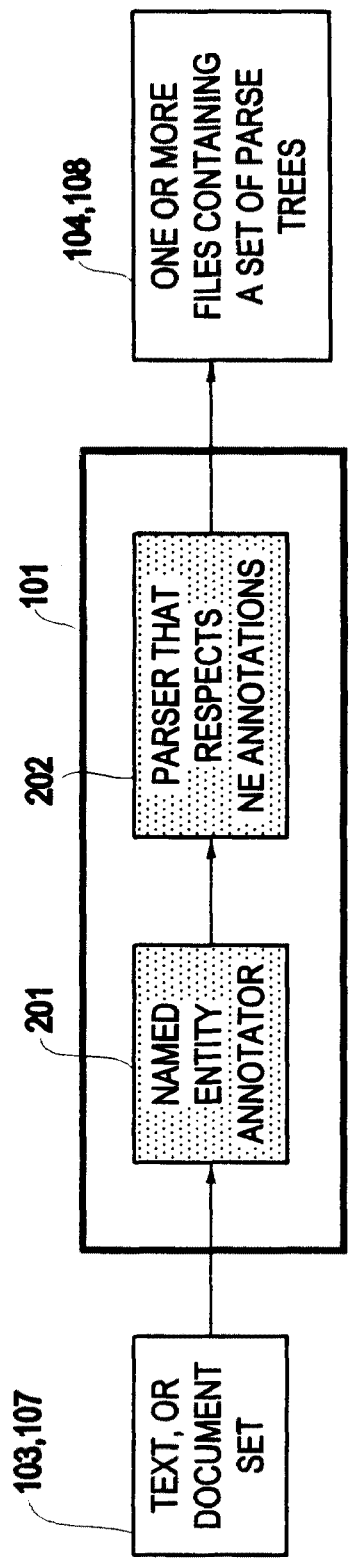
FIG. 2 illustrates a block diagram of the Linguistic Analyzer 101.

FIG. 2 illustrates a block diagram of components of an exemplary linguistic analyzer 101 used in the present invention. The Named Entity Annotator (NE Annotator) 201 identifies named entities mentioned in text input 103, 107 and stores the information it finds as text annotations, either as a sequence of characters in text or a sequence of words in text.

The parser 202 used in the linguistic analyzer is one that "respects the named entity annotations." This expression means that the named entities mentions, which may span several words, that are identified in text by the NE annotator 201 are treated as single tokens by the parser 202.

FIG. 3 provides a sample 300 of an actual output 104, 107 of the Linguistic Analyzer 101. As shown in FIG. 1, this output could be due to the action in either the learning phase (e.g., A3) or the application phase (e.g., B3). The input sentence 301 is "Carlson acquired Ask Mr. Foster in 1979." The named entities 302 from the Named Entity Annotator 201 are also shown. Since named entity annotation preceded parsing, the word "Ask" was included in the name of an organization, and so it was not treated as a verb by the parser, thus improving the accuracy of the parser.

FIG. 4 illustrates a block diagram 400 of the PI Pattern Learner 102. Relation Definition User Interface submodule 401 enables the user to: (1) name a relationship; (2) specify the number of relation arguments and their names; and (3) store this information in memory. It is even possible for a relation to have zero arguments, and this would be the case if the user had an interest in simply defining patterns characteristic of a certain kind of text without identifying specific slot fillers.

Relation Instance Definition User Interface submodule 402 enables the user to: (1) choose a relation definition stored in memory by the Relation Definition User Interface 401; (2) select a text corpus processed by the Linguistic Analyzer module; (3) choose text, which often, but not necessarily, are single sentences, from the corpus; (4) identify relation instances in the chosen corpus consistent with the chosen relation definition, including none, some, or all, of the slot fillers in the chosen text; and (5) compute, name, and store PI patterns containing this information in memory accompanied by the original text giving rise to the PI pattern.

User Interface for the Selection of Instances and for Computing Generalizations submodule 403 enables the user to: (1) view relation instances stored in memory by User Interface submodule 402; (2) select two or more of those relation instances; and (3) compute, name, and store in memory a PI pattern that is a generalization of the selected instances.

It is noted that, generally, it is neither practical nor useful to view the complete structure of relation instances, due to their complexity. Instead, just critical parts, such as the original text, the name of the relation, and the text filling the slots (e.g., the relation arguments), normally need to be viewed.

Figure 6:
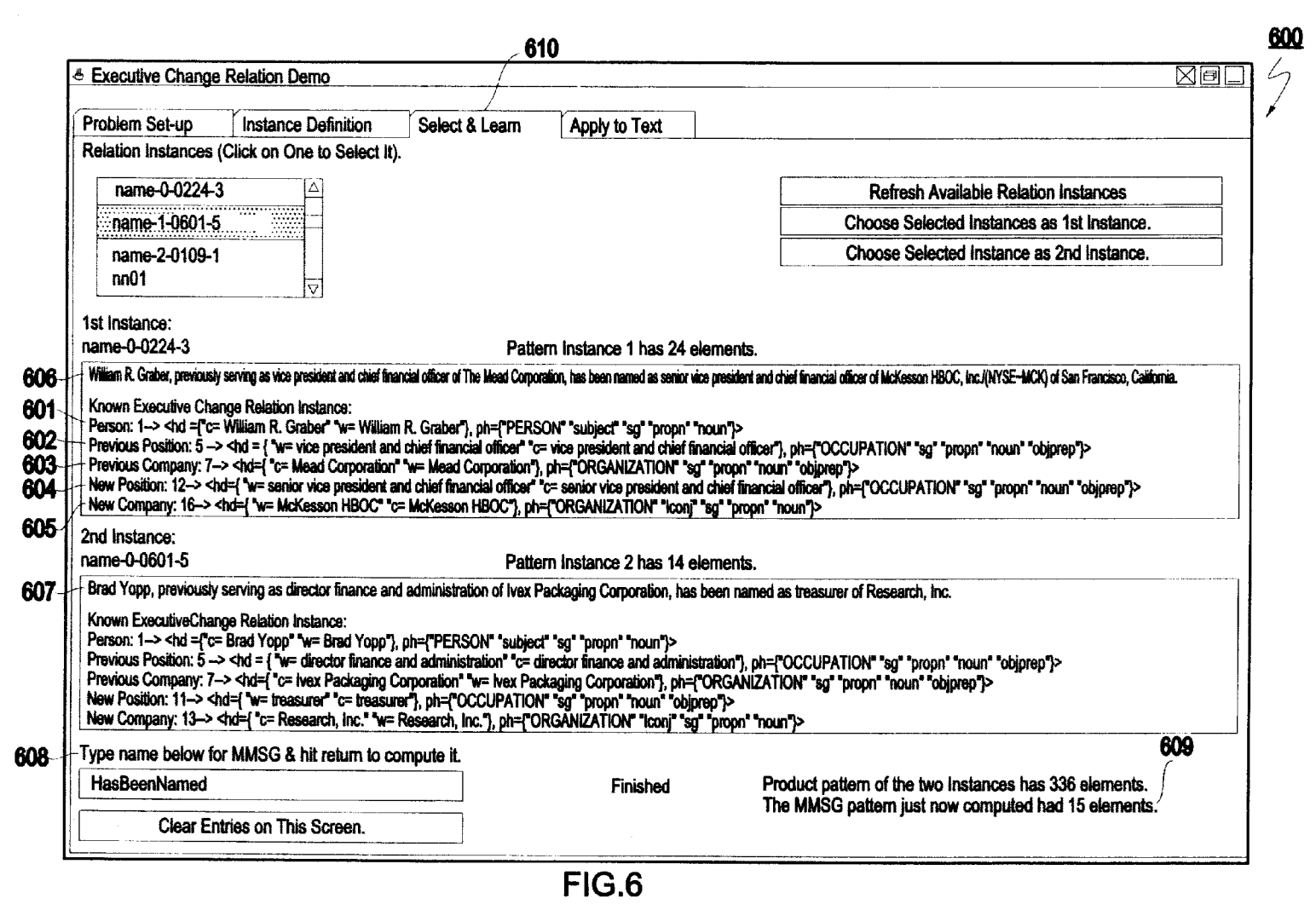
Figure 7:
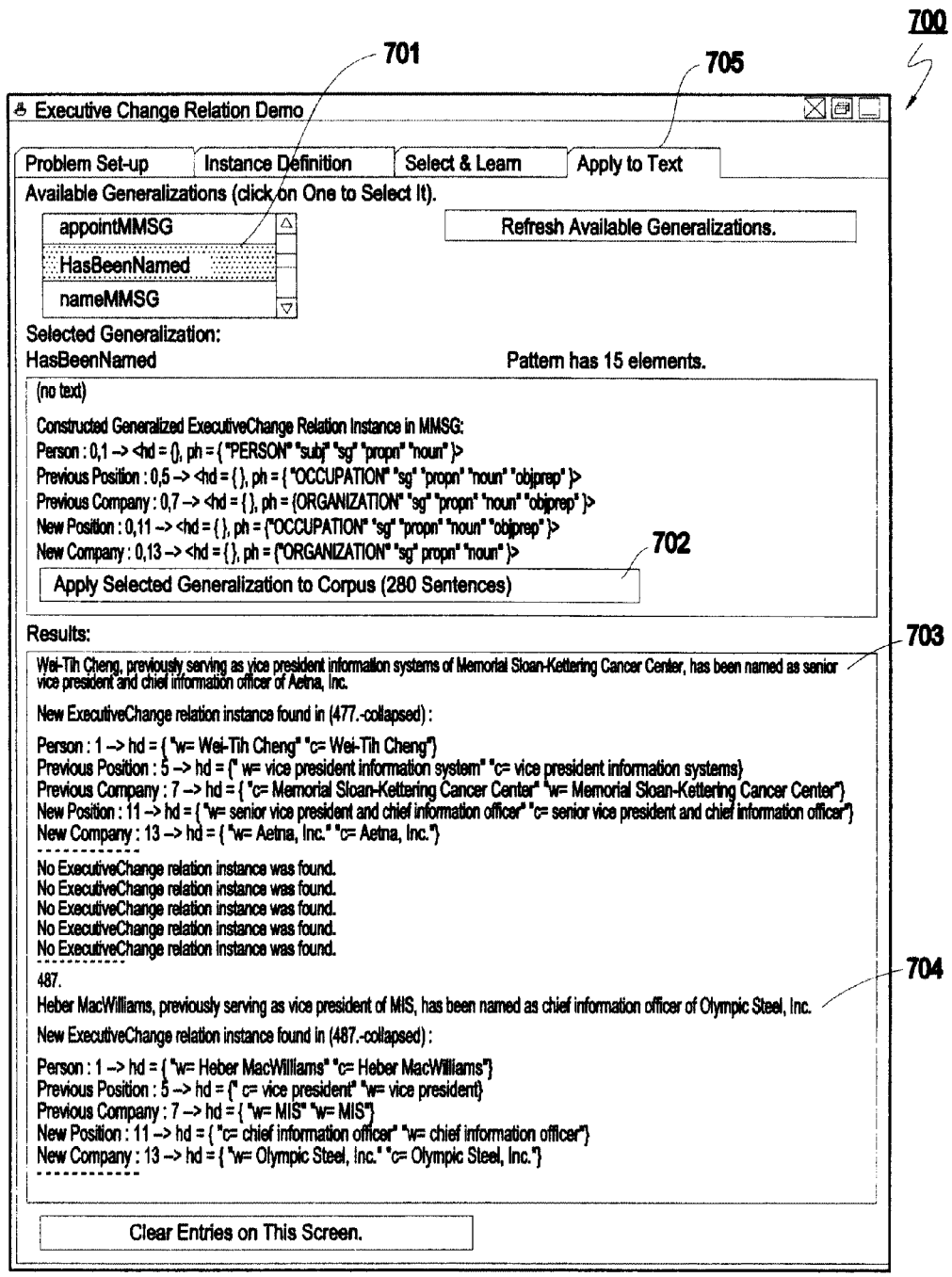
FIG. 7 illustrates an exemplary screen shot 700 from a demonstration system that illustrates the application of a PI pattern.

FIGS. 5, 6, and 7 illustrate exemplary screen displays 500, 600, 700 from a prototype demonstration of the tool that embodies methods of the present invention.

FIG. 5 shows an exemplary screen display 500 from the demonstration system that illustrates the process of defining a relation instance. The user selects this display 500 by the "Instance Definition" tab 501 in the upper menu bar. The screen 500 contains an upper panel 502 for viewing a corpus of sentences that have undergone linguistic analysis and for selecting a sentence from that corpus by, for example, user inputs from a mouse.

The middle panel 503 permits the user to examine a particular sentence that is to be the basis of a pattern containing a relation instance and to select linguistic elements (e.g., a noun phrase, a prepositional phrase, etc.) from that sentence. The bottom panel 504 enables the user to construct a relation instance in a step-by-step fashion based on items selected in the middle panel by associating argument names (e.g., "Previous Position") with pattern elements (e.g., "vice president and chief financial officer", which is the head of a noun phrase and which is treated as a single token because it was identified as an OCCUPATION entity in the course of the linguistic analysis of the sentence).

Note that the bottom panel 504 also contains a text field 505 in which the relation instance can be given a name and can also be saved, so that it can later be retrieved using that name.

FIG. 6 shows an exemplary screen display 600 from the demonstration system that illustrates the learning of a PI pattern. That is, this figure reflects an implementation of submodule 403 (User Interface for the Selection of Instances and for Computing Generalizations submodule).

At the start of this stage, a set of sentences has already been processed in which named entities have been identified and in which the sentences have been parsed. For each sentence, based on user inputs, a PI pattern has been generated from the parse by the Relation Instance Definition User Interface 402 and stored in memory.

Using the screen 500 exemplarily illustrated in FIG. 5, a user has determined that each of these sentences contains an instance of the "ExecutiveChange" relation, which takes five arguments (alternatively termed "slot fillers") called "Person" 601, "Previous Position" 602, "Previous Company" 603, "New Position" 604, and "New Company" 605. The elements of the PI pattern that correspond to slot fillers in these sentences have all been determined by the user, and this information has been stored as part of the stored PI patterns.

Two of the sentences 606, 607 have been selected and displayed in FIG. 6. The basis for selection was the user's judgment that the sentences were structurally similar. The user chose and entered the name "hasBeenNamed" for the generalization 608, which caused the system to compute and store a Minimal Most Specific Generalization (MMSG) 609 of the two selections.

The MMSG is a smallest representation of exactly the structure common to both the selected instances. It is computed by an implementation of an algorithm given in the theory discussed in the above-referenced Provisional Application and briefly described later.

FIG. 7 is a screen shot from a demo system using the pattern learned (e.g., FIG. 6) to find hitherto undiscovered instances of the "ExecutiveChange" relation. Thus, this figure reflects an implementation of the functionality of the "PI Pattern Applier" Module 106 in FIG. 1. It is noted that a corpus selection dialog and a means for the user to tell the system where to store the results are not shown in this representation.

In relating FIG. 7 back to the view of FIG. 1, at the start of this stage represented in FIG. 7, a set of learned generalizations 105 has been obtained that include the "hasBeenNamed" generalization. There is also a corpus of sentences 107 processed by the Linguistic Analyzer 101, in which named entities have been identified, and in which the sentences have been parsed (e.g., 108). The user's intent at this stage (e.g., 109) is to find new relation instances in this large corpus 107.

FIG. 7 shows that the user has selected the "hasBeenNamed" PI pattern 701, the "hasBeenNamed" PI pattern has been applied to each sentence in the corpus, and the results of this computation have been stored and displayed to the user.

When the "hasBeenNamed" pattern is applied to the corpus (e.g, by using selector 702), (1) each processed sentence is loaded in turn into memory, (2) then a sentence PI pattern is computed based on the named entities present and the parse of the sentence, and (3) then the system carries out a computation that constructs all pattern-preserving maps from the selected "hasBeenNamed" PI pattern to each sentence PI pattern, provided that such a map exists. The construction of each pattern-preserving map signifies the discovery of an "ExecutiveChange" relation instance, including those slot fillers able to be identified, that can be reported to the user and stored in memory. Two matching sentences 703, 704 are shown in FIG. 7.

It is also noted the this stage shown in FIG. 7 was arrived at by selecting the "Apply to Text" tab 705 at the top of the Graphical User Interface display. Similarly, the stage shown in FIG. 6 was initiated by selecting the "Select & Learn" tab 610.

From the above description, it can now be recognized that the exemplary relation extraction system of the present invention can be described as combining the following three elements:

1. Named Entity (NE) Annotation

This terminology is also called "Named Entity Mention Detection". NE Annotation may be based on statistical machine learning, dictionary lookup, hand-written regular expressions, etc.

2. General Linguistic Analysis

In an exemplary embodiment, this element is implemented as deep parsing via IBM's Slot Grammar technology, but it can be implemented in any parser that respects the NE Annotation of the first element. The general linguistics analyzer is configurable via ontologies and dictionaries.

3. New Approach to Relation Extraction

This new type of symbolic machine learning is based on the new mathematical theory of "Precedence-Inclusion Patterns." The learning of Precedence-Inclusion patterns is a type of symbolic machine learning based on the new mathematical theory of pattern generalization developed by one of the co-inventors, as presented in the above-referenced Provisional Application. This new theory of symbolic learning is suitable for learning patterns from structures describing how elements are arranged with respect to one another and, in particular, as embodied in the present invention, from parse trees. This technique is capable of learning accurate generalization from a few examples (e.g., only two examples, or even a single example), unlike the current statistical machine learning approaches that require hundreds or thousands of labeled instances of training data.

An advantage of using the general linguistics analysis is that the clause-level structure of language becomes domain-independent.

However, general linguistic analysis has a disadvantage in that general parsers are typically less accurate than domain-specific parsers. Additionally, special expertise is typically required to extend or correct general parsers.

To overcome these problems, the present invention combines NE annotators, which may be domain-specific, with a general parser to improve the quality of parses. As an added benefit, identification of Named Entities will help in learning PI patterns and in applying those patterns to find relation instances in text.

Precedence-inclusion patterns, "PI patterns" for short, are a new class of mathematical objects developed by one of the present inventors that include, but are substantially wider than, constituent structure trees. The theory of PI patterns is explored in detail in the paper "Precedence-Inclusion Patterns and Relational Learning," by Frank J. Oles, the subject of the above-identified Provisional Application and which paper has been submitted for publication to Theoretical Computer Science.

To further explain the concepts present in the Theory of Precedence-Inclusion Patterns, the following sentence "Mary went to the store" can be said to have a pattern. The same pattern appears in the following three sentences: "Last night, Mary went to the store"; "Mary went quickly to the store"; and "Mary went to the new store."

However, the basic pattern is not present in "Mary went to the movies after the store closed," even though this last sentence contains the same sequence of tokens: "Mary went", "to", "the store."

The conclusion to be reached is that patterns in text should involve more than identifying sequences of tokens, even tokens with types assigned. Therefore, relative to the present invention, in defining text-based patterns, two interrelated strict partial orders are used:

1. Strictly precedes: $x<y$, as illustrated by:
Mary<went<to the store.
2. Strictly includes: $x \supset y$, as illustrated by:
to the store $\supset$ store.

It should be noted that the above sentences demonstrate that the partial order concept is related to the analysis of language.

A pattern P generalizes a pattern Q when there is a pattern-preserving map from P to Q. Thus, if parentheses are placed into sentences to represent sentence structure derivable from parsing, there are pattern-preserving maps from "(Mary went (to the store))" to each of "(Last night Mary went (to the store))"; "(Mary went quickly (to the store))"; and "(Mary went (to the new store))". But, there is no pattern preserving map from "(Mary went to the store)" to "(Mary went (to the movies) (after the store closed))", since the parenthetic structures derived from parsing are inconsistent in these two sentences.

Roughly speaking, PI patterns are sets (1) equipped with two strict partial orders—called precedence and inclusion—that interact with one another through laws called interactive transitivity and interactive irreflexivity, and (2) whose elements may be assigned attributes. PI patterns have a precisely-defined concept of generalization based on the existence of a pattern-preserving mapping from a general pattern to a more specific one, which provides a principled setting for exploring pattern generalization.

This well-founded approach to pattern generalization has deeper consequences. It leads to the fact that each nonempty set of PI patterns has a most specific generalization (MSG) that is again a PI pattern. Conceptually, an MSG plays a similar role to a least general generalization in inductive logic programming. Unfortunately, there is nothing canonical about an MSG of a set of patterns. However, it is a theorem that every nonempty finite set S of finite PI has a precisely defined best MSG, again a PI pattern, called a "minimal most specific generalization" (MMSG) of S. Moreover, an MMSG of a nonempty finite set of finite PI patterns is unique up to isomorphism.

The theory described above was developed independent of any particular approach to parsing in mind, and it is compatible with partial parsing approaches that do not attempt to fully analyze sentences. However, this theory can be used most advantageously with full parsers, such as English Slot Grammar (ESG), aided by statistical named-entity recognizers.

In the present invention, PI patterns are learned from small numbers of example sentences that contain Event mentions, and the learned PI patterns are then applied to other sentences in order to find new Event mentions. For this task, sentences in which named entity mentions are machine-labeled are parsed by ESG.

Figure 8:
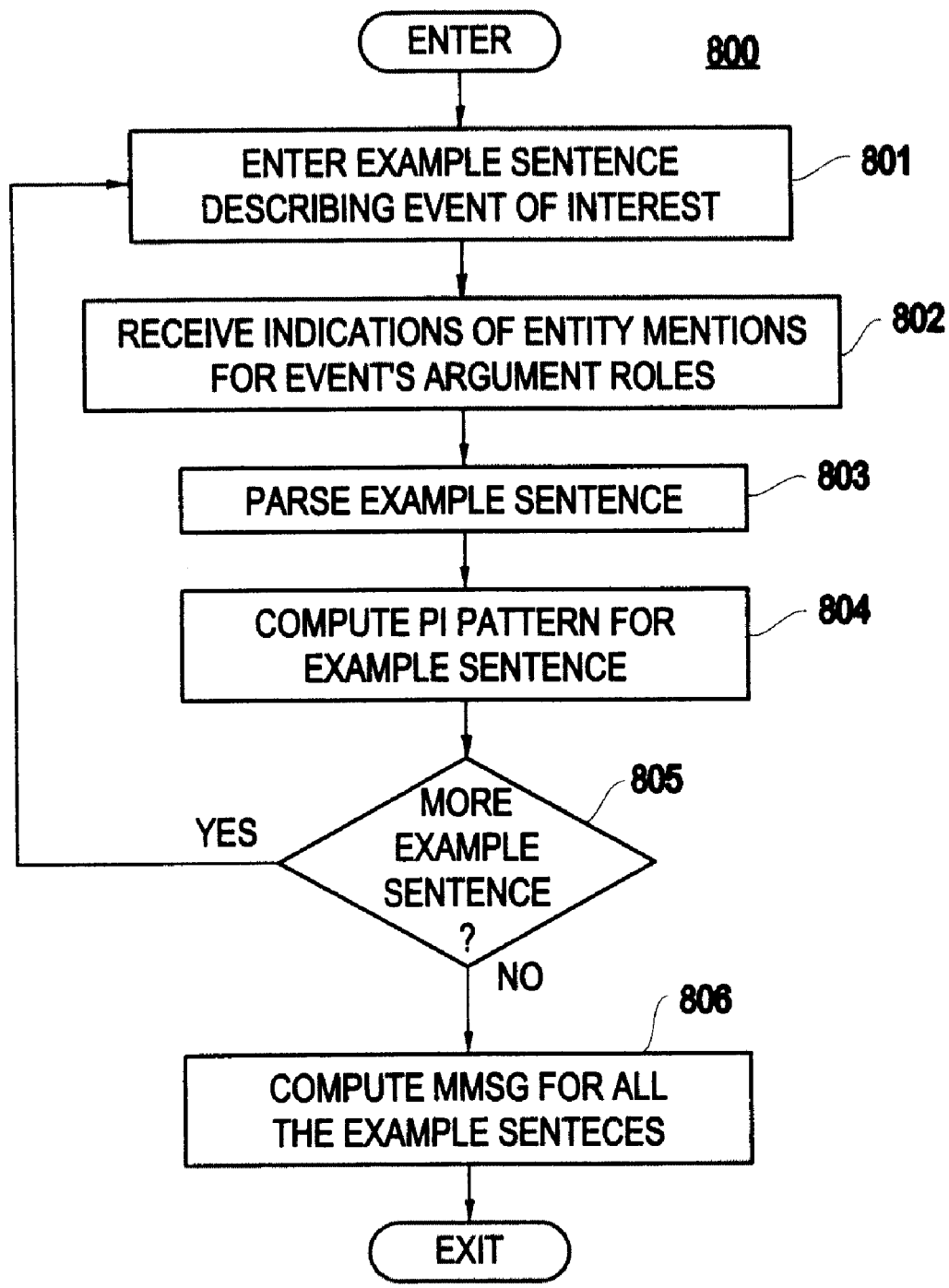
FIG. 8 shows an exemplary flowchart 800 of the learning phase.

As shown by the exemplary flowchart of FIG. 8, the learning phase 800 proceeds as follows:

In step 801, the user picks out or creates a similar example sentence describing an Event of interest. It might be preferable, but is not necessary for the operation of the tool, that at least two similar sentences be presented.

In step 802, the user indicates the Entity mentions that fill the Event's argument roles in each example sentence.

In step 803, the parser will parse the sentence, and, in steps 804 and 805 the PI Pattern Learner 102 will compute PI patterns for each of the example sentences, including the information about the event of interest and compute the MMSG of the example PI patterns, which will necessarily contain what might be called a "generalized event".

In step 806, the user will indicate either that another example sentence will be entered, by choosing the "Instance Definition" tab from the menu at the top of the tool display, thereby returning to step 801, or will exit the learning phase.

Figure 9:
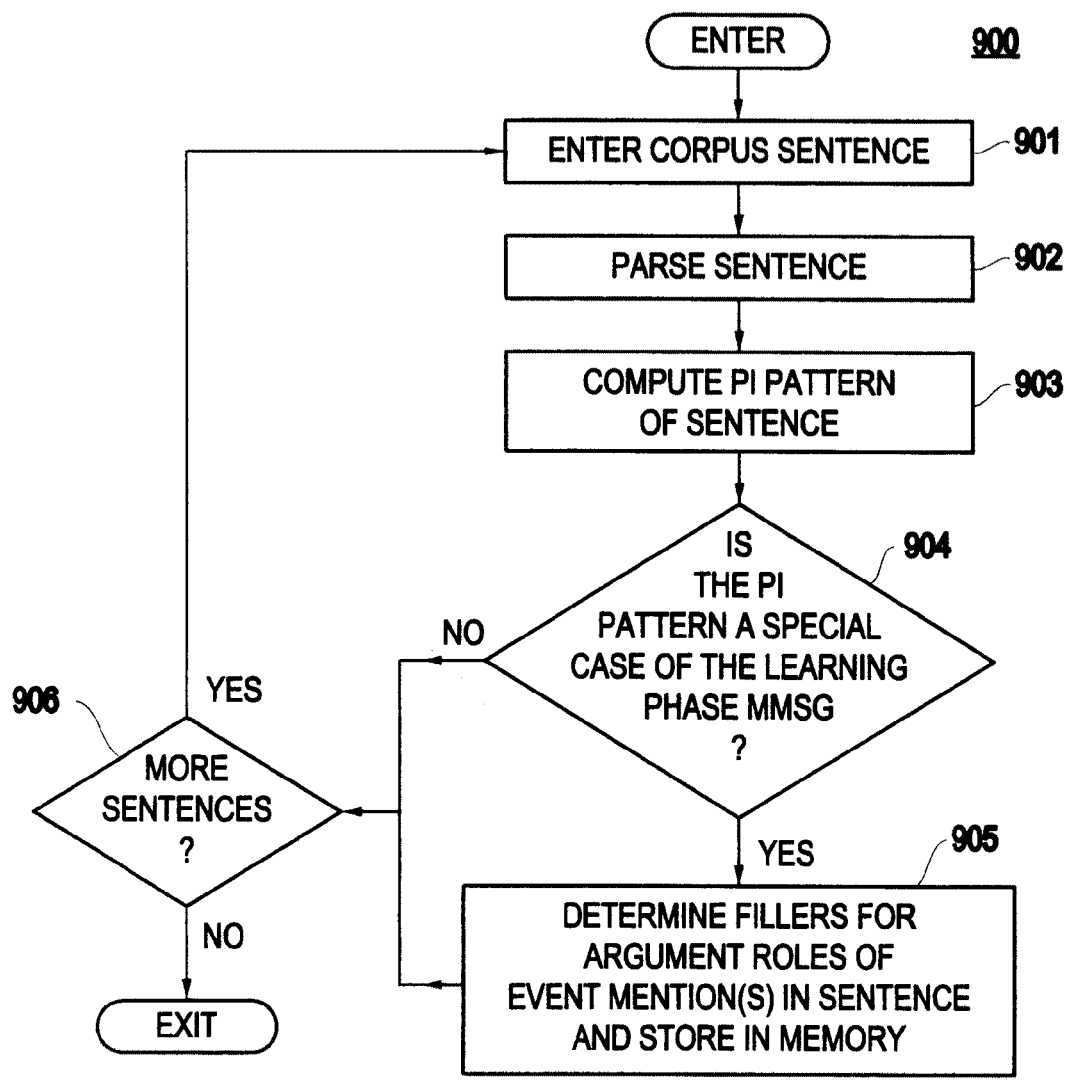
FIG. 9 shows an exemplary flowchart 900 of the application phase.

To find Event mentions in new, unseen sentences, the application phase will proceed in the following manner exemplarily shown in the process 900 of FIG. 9. The user enters this application phase by selecting the "Apply to Text" menu tab 705 (see FIG. 7).

In steps 901 and 902, a sentence is received from the document corpus and parsed into a parse tree. In steps 903, and 904, the PI Pattern Applier 106 computes the PI pattern of this sentence and, if the PI pattern is determined to be a special case of the MMSG of the learning phase by computing a pattern-preserving map from the more general pattern to the more specific one if there is one, determines the fillers for the argument roles of the event mentions in the sentence. If a pattern-preserving mapping was found in the previous step, in step 905 the PI Pattern Applier 106 determine the fillers for the argument roles of the Event mentions(s) in the sentence. In step 906, this sequence is continued for all sentences of the corpus.

Figure 10:
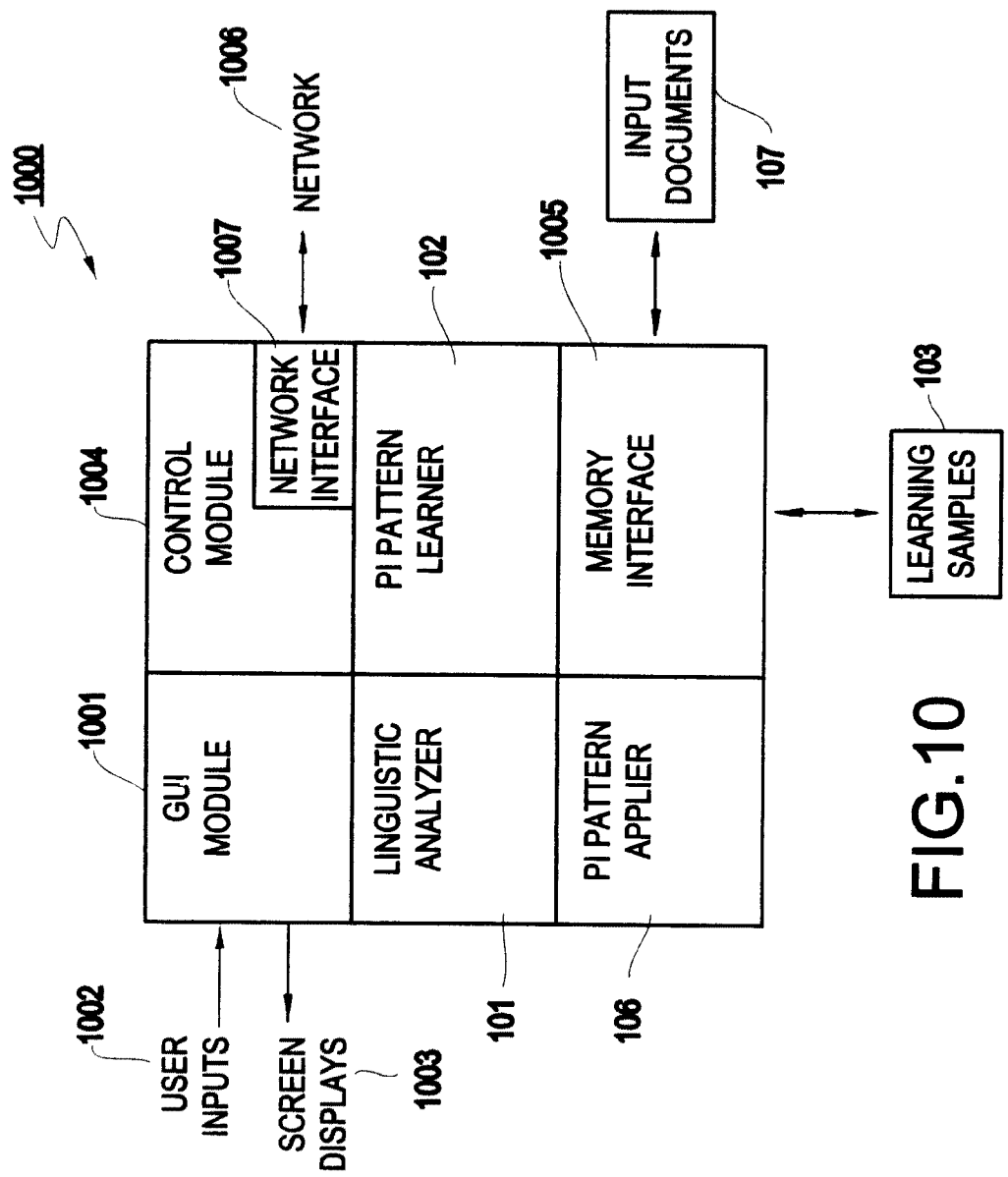
FIG. 10 illustrates an exemplary block diagram of the major components of the modules of an exemplary software tool 1000 that embodies the present invention.
Figure 12:
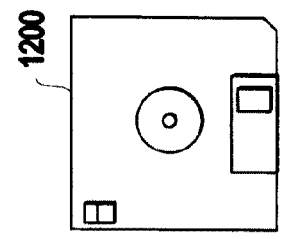
FIG. 12 illustrates a signal bearing medium 1200 (e.g., storage medium) for storing steps of a program of a method according to the present invention.

FIG. 10 illustrates an exemplary block diagram 1000 of the major components that might comprise a computer tool for implementing the present invention. Graphical User Interface (GUI) module 1001 allows the user to provide inputs 1002 and provides the display information 1003 for the screen displays, such as discussed for FIGS. 5-7. Control module 1004 provides the control instructions to interconnect the various modules and to control the information passing therebetween. The functions of the linguistic analyzer 101, PI pattern learner 102, and PI pattern applier 106 have been previously discussed. Memory interface 1005 controls the flow of information between local memory, as well as the flow of information to a possible database such as might contain the corpus documents for either the learning examples 103 or the input documents 107 used in the search phase. Of course, it should be noted that, if the input documents for the search phase is directed to a search over an external network 1006, then the tool 1000 would include a network interface 1007, exemplarily shown in FIG. 10 as a submodule of the control module 1004.

An important note is made here that, although the present invention has been discussed as used to execute a search through a database or a series of databases or data sources, it should not be considered as being so limited. Thus, for example, the present invention might be utilized in environments in which there is no fixed database or data sources but, rather, a real-time data source. As one possible non-limiting example, the present invention might be used for searching real-time text data in an intelligence-gathering environment, wherein no discrete and readily-identifiable database exists.

Illustration of Technical Approach

For an actual demonstration of the approach of the present invention, a small corpus of real English sentences that contain many events of the same type, but still exhibit linguistic variability, was created. Since it was desirable not to be impeded by the problem of named entity coreference resolution, a corpus was used in which events of interest were fully described in single sentences.

This corpus, containing 280 sentences and headlines, was constructed from short news stories found on the Executive-Select.com website. These stories dealt with executive position changes. Named entity mentions, specifically PERSON, LOCATION, OCCUPATION, and ORGANIZATION, were marked in the corpus by hand, and all sentences were parsed in the corpus with ESG.

In an experiment, two similar example sentences, containing instances of a relation that was called the ExecutiveChange relation. This is an "Event", in ACE terminology. Automatic Content Extraction (ACE) is a Federal government NIST program having an objective to develop technology for extracting content from natural language text. ACE organizes annual competitive workshops to advance this objective.

In this experiment, the ExecutiveChange Event was defined to have five arguments called Person, Previous Position, Previous Company, New Position, and New Company. Thus, each ExecutiveChange Event could be viewed as a template with five slots to fill. Here is the first example sentence (see item 606 of FIG. 6):

William R. Graber, previously serving as vice president and chief financial officer of The Mead Corporation, has been named as senior vice president and chief financial officer of McKesson HBOC, Inc./(NYSE~MCK) of San Francisco, Calif.

The PI pattern derived from the parse tree of this sentence has 24 elements.

And here is the second example sentence (see item 607 of FIG. 6):

Brad Yopp, previously serving as director finance and administration of Ivex Packaging Corporation, has been named as treasurer of Research, Inc.

The PI pattern derived from the parse tree of this sentence has 14 elements.

While these two example sentences resemble each other strongly (in particular, the verb forms are the same), it should be noted that there are significant differences. The parse tree of the first one, having 48 nodes, is almost twice as large as the parse tree of the second one, which has 28 nodes. The nodes that correspond to arguments for the ExecutiveChange Event were then marked in each sentence.

Note that this marking of nodes by a user requires no special knowledge of linguistics. In the first sentence, the slot fillers turned out to be, respectively, pattern elements 1, 5, 7, 12, and 16. This relation instance, including attributes of elements that come from the ESG parse tree, can be displayed as follows:

Known ExecutiveChange relation instance:

---

Person : 1 --> <hd = { "c= William R. Graber" "w= William R. Graber" },
    ph = { "PERSON" "subj" "sg" "propn" "noun" }>
Previous Position : 5 --> <hd = { "w= vice president and chief
    financial officer" "c= vice president and chief financial
    officer" }, ph = { "OCCUPATION" "sg" "propn" "noun" "objprep" }>
Previous Company : 7 --> <hd = { "c= Mead Corporation" "w= Mead
    Corporation" }, ph = { "ORGANIZATION" "sg" "propn" "noun" "objprep" }>

```
New Position : 12 --> <hd = { "w= senior vice president and chief
    financial officer" "c= senior vice president and chief financial officer" }, ph =
    { "OCCUPATION" "sg" "propn" "noun" "objprep" }>
New Company : 16 --> <hd = { "w= McKesson HBOC" "c= McKesson HBOC" },
    ph = { "ORGANIZATION" "lconj" "sg" "propn" "noun" }>
```

The ExecutiveChange Event in the second sentence is similarly identified, and can be displayed as follows:

Known ExecutiveChange relation instance:

```
Person : 1 --> <hd = { "c= Brad Yopp" "w= Brad Yopp" }, ph = { "PERSON"
    "subj" "sg" "propn" "noun" }>
Previous Position : 5 --> <hd = { "w= director finance and
    administration" "c= director finance and administration" }, ph =
    { "OCCUPATION" "sg" "propn" "noun" "objprep" }>
Previous Company : 7 --> <hd = { "c= Ivex Packaging Corporation" "w=
    Ivex Packaging Corporation" }, ph = { "ORGANIZATION" "sg"
    "propn" "noun" "objprep" }>
New Position : 11 --> <hd = { "w= treasurer" "c= treasurer" }, ph = {
    "OCCUPATION" "sg" "propn" "noun" "objprep" }>
New Company : 13 --> <hd = { "c= Research, Inc" "w= Research, Inc" },
    ph = { "ORGANIZATION" "sg" "propn" "noun" "objprep" }>
```

The product pattern of these 2 PI patterns has 336 elements.

Next, a Java® package which can be applied to any PI pattern generalization problem, computed the MMSG of these two patterns, which is not a parse tree, and in which there is a generalized ExecutiveChange relation instance that says nothing specific about the text that appears in the slot fillers. The MMSG of these 2 patterns has 15 elements.

The constructed generalized ExecutiveChange relation instance is partially described as:

```
Person : 1 --> <hd = { }, ph = { "PERSON" "subj" "sg" "propn" "noun" }>
Previous Position : 5 --> <hd = { }, ph = { "OCCUPATION" "sg" "propn"
    "objprep" "noun" }>
Previous Company : 7 --> <hd = { }, ph = { "ORGANIZATION" "sg" "propn"
    "objprep" "noun" }>
New Position : 11 --> <hd = { }, ph = { "OCCUPATION" "sg" "propn"
    "objprep" "noun" }>
New Company : 13 --> <hd = { }, ph = { "ORGANIZATION" "sg" "propn"
    "noun" }>
```

Note that the MMSG has more elements than the smaller of the two example patterns that generated it. This is an indication of the fact that one does not get an MMSG by deleting pattern elements in one PI pattern that somehow do not match any element in another PI pattern. When a program applies this pattern to the corpus, thirteen new mentions of the ExecutiveChange Event will be discovered in a few seconds, such as:

Lance J. Bennett, previously serving as vice president and associate general counsel of The Dime Savings Bank of New York, has been named as vice president and general counsel of Dime Community Bancshares, Inc.

The new ExecutiveChange relation instance that was found is:

```
Person : 1 --> hd = { "w= Lance J. Bennett" "c= Lance J. Bennett" }
Previous Position : 5 --> hd = { "c= vice president and associate
    general counsel" "w= vice president and associate general
    counsel" }
Previous Company : 7 --> hd = { "w= Dime Savings Bank of New York" "c=
    Dime Savings Bank of New York" }
New Position : 12 --> hd = { "c= vice president and general counsel"
    w= vice president and general counsel" }
New Company : 14 --> hd = { "c= Dime Community Bancshares, Inc" "w=
    Dime Community Bancshares, Inc" }
```

Although the ExecutiveChange Event slot fillers that come from sentences containing the verb form "has been named" could have been found by writing a simple ad hoc program, the important points to keep in kind are that this processing can be done in a completely general way, and no knowledge of linguistics is needed on the part of a user to define PI patterns that can then be used to extract knowledge from text. It is noted that, in the very limited tests carried out to test the present invention, no errors were made in finding arguments for the ExecutiveChange Event.

It is also noted that the above demonstration shows that it is possible for one of the example sentences to have an active verb and the other to have a passive verb. Additionally, the technique can handle the absence of some relation arguments from an example used to generate a PI pattern.

Brief Description of the Mathematical Theory of Precedence Inclusion Patterns

The following very brief discussion of the mathematical theory underlying the present invention is further discussed in a paper entitled "Patterns Based on Multiple Interacting Partial Orders" by one of the co-inventors, Frank J. Oles of IBM T.J. Watson Research Center, Yorktown Heights, N.Y. 10598, as presented in the above-referenced Provisional Application 60/586,877.

It is first noted that the mathematical theory encompasses more than the method discussed above to extract information from unstructured text, since the theory additionally applies to extraction of information from images. Thus, the present invention can be viewed as a concrete implementation of a somewhat narrow, specific application of this new mathematical theory as it relates to text. That is, the tool of the present invention is not currently implemented to apply the precedence inclusion pattern theory to image analysis, and it is expected that several problems need to be solved before the theory can be embodied in a tool for images. However, the interested reader is invited to read this paper for more details of this mathematical theory than is discussed below.

The referenced paper outlines a theory of patterns where the patterns are based on multiple interacting strict partial orders. For instance, a pattern extracted from a video may have as its elements some picture elements occurring in individual frames of the video. There are four natural strict partial orders relating those elements: elements may be ordered by the ordering of the frames in which they occur, and elements within a single frame may be above one another, to the left of one another, and included within one another.

Other examples come from parsing text (e.g., the subject of the present invention), where linguistic entities in a parse tree may precede one another or they may contain one another. In fact, categories of what is referred to in the paper as "2-patterns" include among their objects constituent structure trees, as they are normally defined in computational linguistics.

As mentioned previously, the theory in this paper was motivated by current problems of relational learning, an important kind of inductive learning in which one wishes, from known training instances of related elements of structures, to create general rules for identifying elements of other structures that bear the same relation to one another.

For instance, one may wish to learn from text examples patterns expressing the fact that a disease has a symptom (a binary relation) or that a person has a position in a company (a ternary relation). As another example, one may want to learn the properties that some nucleotide sequences have in common as well as learning out how to pick out a particular subsequence of interest (a unary relation).

The general supervised learning problem of classification can be cast as learning a O-ary relation. This inductive learning approach of this paper is called category-theoretic inductive learning since the notion of generalization employed is based on morphisms between structured objects. An ordered pair $[<, \supset]$ of binary relations on a set is said to be interactively transitive if both $<$ and $\supset$ are transitive and, for all x, y, z∈P, 1. x<y and y $\supset$ z implies x<x, and
2. y $\supset$ x and y<z implies x<z.

Interactive transitivity is an extension of the concept of a transitive, binary relation to an ordered pair of binary relations. By reading as the symbology "<" as meaning "precedes" and the symbology " $\supset$ " as meaning "includes," the intuitive content of these axioms may become more clear to the reader.

For instance, in the domain of two-dimensional images, the ordered pair of relations [is to the left of, contains] is interactively transitive, as also would be the ordered pair [is above, contains].

Roughly speaking, a precedence-inclusion pattern is a set equipped with a strictly partially ordered set of strict partial orders, along with some additional structure, in which the strict partial order on the strict partial orders is taken to assert that each related pair of strict partial orders obeys the axioms of interactive transitivity. A precise definition starts in an algebraic style. A pattern signature an ordered triple $\Sigma=(O, A, L)$ in which:

1. O, the order symbol set of $\Sigma$, is a strictly partially ordered set of binary relation symbols, each of which is intended to be interpreted as a strict partial order on a set;
2. A, the argument name set of $\Sigma$, is a set whose elements name the arguments for some A-ary relation of interest, instances of which may be found in patterns; and
3. L, the property poset of $\Sigma$, is a bounded complete poset of labels that may be attached to elements of structures.

Definition

Let $\Sigma=(O, A, L)$ be a pattern signature. It is said that a set is a $\Sigma$-pattern when every σ∈O has an interpretation $<_{o,P}$ as a strict partial order on P, along with a partial function $\alpha_P: P \to L$, called the argument naming function, and a total function $A_P: P \to L$, called the labeling function, such that σ<τ implies that the ordered pair of relations $[<_{o,P}, <_{\tau,P}]$ is interactively transitive.

When $\Sigma$ is clear from context, a $\Sigma$-pattern is called a precedence-inclusion pattern. Thus, when the order symbol set O is empty, $\Sigma$-patterns are just sets with some additional structure. When the order symbol set is one-element set, then $\Sigma$-patterns are strictly partially ordered sets with some additional structure.

More interesting examples arise when the order symbol set is nontrivial. Examples of precedence-inclusion patterns in which the order symbol set has arbitrary finite depth can be constructed.

A $\Sigma$-pattern Q is a generalization of a $\Sigma$-pattern if there is a pattern-preserving map, i.e., a morphism in the category of $\Sigma$-patterns, from Q to P.

The reader can now guess at the definition of a most specific generalization (msg) of a set of patterns, which corresponds to a least general generalization (lgg) in inductive logic programming. Like lgg's, msg's are not unique, although products of patterns give (typically very large) examples of them. The problem with a large msg is that it would be computationally hard to test if another pattern is a specialization of it.

A minimal most specific generalization of a set P of patterns is an msg of P no subpattern of which is an msg of P. These are the kinds of generalizations that are desired. A retraction of a precedence-inclusion pattern P is an idempotent endomorphism r:P→P, and the set of fixed points of a retraction defines a pattern called a retract of P. A pattern having no proper retracts is said to be fully retracted.

Here is the main theorem. For the finite case, it covers the existence and uniqueness of the minimal most specific generalization, and, implicitly, tells how to compute it.

Theorem

Let I be a nonempty finite index set and let $P=\{P_i | i \in I\}$ be an I-indexed set of finite Σ-patterns.

1. There exists a minimal most specific generalization M of P.
2. M is finite and fully retracted.
3. Any minimal most specific generalization of P is isomorphic to M.
4. Any finite most specific generalization Q of P has a retraction r:Q→Q whose image is isomorphic to M.

Below is an exemplary explicit description of a simple procedure that is guaranteed to return the minimal most specific generalization of a nonempty finite set $\{P_1, P_2, \ldots, P_n\}$ of finite Σ-patterns.

Minimal Most Specific Generalization Procedure $M:=P_1 \times P_2 \times \ldots \times P_n$;
while there exists a proper retract Q of M
do M:=Q;
return M;

Hardware Implementation

Figure 11:
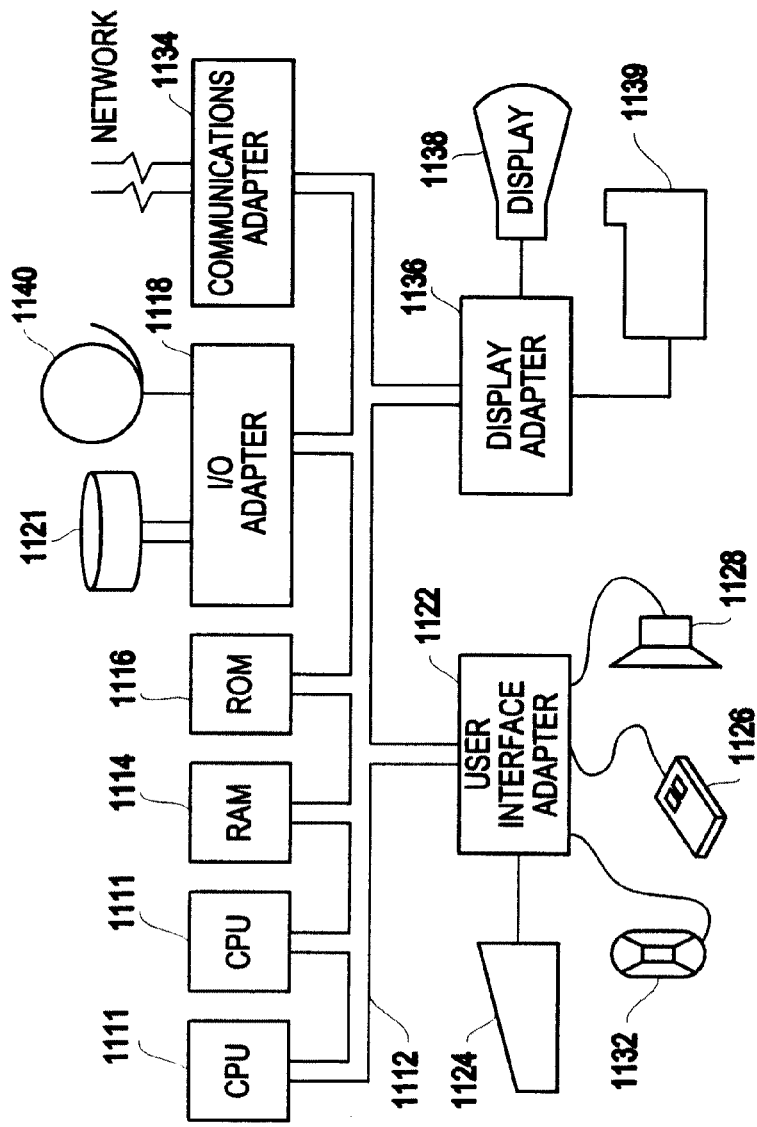
FIG. 11 illustrates an exemplary hardware/information handling system 1100 for incorporating the present invention therein.

FIG. 11 illustrates a typical hardware configuration of an information handling/computer system in accordance with the invention and which preferably has at least one processor or central processing unit (CPU) 1111.

The CPUs 1111 are interconnected via a system bus 1112 to a random access memory (RAM) 1114, read-only memory (ROM) 1116, input/output (I/O) adapter 1118 (for connecting peripheral devices such as disk units 1121 and tape drives 1140 to the bus 1112), user interface adapter 1122 (for connecting a keyboard 1124, mouse 1126, speaker 1128, microphone 1132, and/or other user interface device to the bus 1112), a communication adapter 1134 for connecting an information handling system to a data processing network, the Internet, an Intranet, a personal area network (PAN), etc., and a display adapter 1136 for connecting the bus 1112 to a display device 1138 and/or printer 1139 (e.g., a digital printer or the like).

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, comprising signal-bearing media tangibly embodying a program of machine-readable instructions executable by a digital data processor incorporating the CPU 1111 and hardware above, to perform the method of the invention.

This signal-bearing media may include, for example, a RAM contained within the CPU 1111, as represented by the fast-access storage for example. Alternatively, the instructions may be contained in another signal-bearing media, such as a magnetic data storage diskette 1200 (FIG. 12), directly or indirectly accessible by the CPU 1111.

Whether contained in the diskette 1200, the computer/CPU 1111, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code.

Software Implementation

Although, in terms of software implementation, the present invention has been demonstrated in Java® for pairs of finite 2-pattern, the resulting minimal msg's can readily be used for discovering new instances of relations. Moreover, it is not intended that the present invention be limited to 2-patterns or to implementation in Java®.

It is noted that, although the prototype has been demonstrated for text in the English language, it should be apparent that one of ordinary skill in the art, after taking the disclosure as a whole, would be able to adapt the present invention to text in other languages. Thus, there is no intent that the method described above be limited to any specific language.

Using the Present Invention as a Service

In yet another aspect of the present invention, it is noted that the present invention can be used as a basis for a service or business method. In this aspect, the present invention might be, for example, implemented as a search method for specific databases or, more generally, for any number of data sources available through a computer network, such as the Internet.

In this aspect, the present invention is intended as covering, not only the tool itself that executes the methods described above, but also a service made available for using this method by others. Thus, for example, an entity might provide the service of conducting searches of databases or the Internet, using the method of the present invention. The present invention is intended as including this exploitation of executing the above-described methods by providing a service to others to conduct searches using these methods. Another service related to the present invention might be based on making a tool available to others so that these clients or customers can themselves use the tool to conduct their own search.

Specific Examples of Searches Possible with the Present Invention

It should go without statement that the present invention can be used for almost any type of search, so that the few example scenarios discussed above should not be considered limiting.

However, along this line, while there is no reason to limit the present invention to specific examples wherein it might be used, a number of non-limiting examples for which it might be employed might include: a web search, wherein a user picks examples and searches for the same relations; intelligence gathering by intelligence agencies; searches by financial analysts, looking for facts, press releases, or SEC filings; or extracting information from clinical notes of medical practitioners.

The searches might be done on propriety or publicly available databases, a computer network, including the Internet, or might even be done in real-time.

While the invention has been described in terms of an exemplary embodiment, those skilled in the art will recognize that the invention can be practiced with modification within the spirit and scope of the appended claims.

Further, it is noted that Applicants' intent is to encompass equivalents of all claim elements, even if amended later during prosecution.

The invention claimed is:

1. A method of preparing a learning pattern for extracting information from text, said method comprising:
    receiving an input sample of text as an input into a computer tool executed by a processor on a computer;
    receiving inputs from a user to name entities within said sample of text;
    parsing said input sample of text to form a parse tree, using a processor on a computer executing a parser that respects named entities of a Named Entity (NE) Annotator, meaning that the parser treats a named entity as a single token;
    presenting said parse tree to a user; and
    receiving user inputs to:
        specify relation arguments and names of components of said parse tree;
        define a machine-labeled learning pattern from said parse tree and its associated user inputs, said machine-labeled learning pattern comprising a precedence inclusion pattern wherein elements in said learning pattern are defined in a precedence relation and in an inclusion relation (PI pattern), based on said user's inputs; and
        store said machine-labeled learning pattern in a memory, said stored learning pattern being available as a query for searching for relation instances in unseen text that matches said PI pattern wherein said user interfaces with said computer tool using:
    a first menu to permit the user to input a sample text, to select and designate argument names for linguistic elements from a selected sample text, and to construct a relation instance of said linguistic elements;
    a second menu to permit the user to generate a PI pattern from one or more relation instances generated using said first menu; and
    a third menu to permit the user to use a PI pattern generated by said second menu to search for undiscovered instances of a relation instance.

2. The method of claim 1, further comprising:
    calculating a generalization of said learning pattern.

3. The method of claim 1, wherein said machine-labeled learning pattern comprises a precedence inclusion pattern wherein elements in said learning pattern are defined in at least one of a precedence relation and an inclusion relation, said data structure comprising an ordered tuple $\Sigma=(O, A, L)$, wherein:
    O comprises an order symbol set of $\Sigma$, a strictly partially ordered set of binary relation symbols, each of which is interpreted as a strict partial order on the set,
    A comprises an argument name set of $\Sigma$, a set whose elements name arguments for A-ary relations of interest, instances of which may be found in patterns, and
    L comprises a property poset (partially ordered set) of $\Sigma$, a bounded complete poset of labels that may be attached to elements of structures.

4. The method of claim 1, wherein said input sample comprises a first input sample, said parse tree comprises a first parse tree, and said learning pattern comprises a first learning pattern, said method further comprising:
    receiving user inputs for receiving and parsing at least one more input sample of text to form therefrom a parse tree, for each said at least one more input sample parse tree, defining therefrom a learning pattern; and
    calculating a generalization of said first learning pattern and at least some of learning patterns defined from said at least one more input sample of text.

5. The method of claim 4, wherein said generalization also comprises a precedence inclusion pattern.

6. The method of claim 5, wherein said precedence inclusion pattern of said generalization comprises a most specific generalization (MSG).

7. The method of claim 6, further comprising:
    calculating a Minimal Most Specific Generalization (MMSG) of all of said learning samples used to define said learning pattern.

8. The method of claim 2, further comprising:
    comparing said learning pattern with an unknown text.

9. The method of claim 7, further comprising:
    comparing said learning patterns with an unknown text 10. The method of claim 9, wherein said comparing comprises:
    parsing each said unknown text to form a parse tree;
    calculating a generalization of said parse tree, said generalization forming a precedence inclusion pattern;
    calculating an MMSG for said generalization; and
    using said MMSG to calculate a similarity of said unknown text to said learning pattern.

11. The method of claim 8, wherein said comparing comprises:
    parsing each said unknown text to form a parse tree;
    calculating a generalization of said parse tree, said generalization forming a precedence inclusion pattern; and
    calculating a similarity of said generalization of said parse tree of said unknown text with said generalization of said learning pattern.

12. An apparatus for relational learning, said apparatus comprising:
    a generator for developing a precedence inclusion (PI) pattern of a learning sample, as executed by a processor on said apparatus, wherein elements in said learning sample are machine-labeled to define a precedence relation and an inclusion relation, based on user inputs, said PI pattern comprising a set equipped with two strict partial orders for said precedence and inclusion that interact with one another through laws of interactive transitivity and interactive irreflexivity; and
    a graphical user interface (GUI) to permit a user to provide inputs used for said developing said PI pattern, wherein said user inputs are used to define a learning pattern wherein said GUI comprises:
    a first menu to permit a user to input a sample text, to select and designate argument names for linguistic elements from a selected sample text, and to construct a relation instance of said linguistic elements;
    a second menu to permit a user to generate a PI pattern from one or more relation instances generated using said first menu; and
    a third menu to permit a user to use a PI pattern generated by said second menu to search for undiscovered instances of a relation instance.

13. The apparatus of claim 12, further comprising:
    a comparison module for applying said PI pattern to unseen text and determining a similarity therebetween.

14. The apparatus of claim 13, wherein said generator further calculates a Minimal Most Specific Generalization (MMSG) of all learning samples entered and said comparison is based on said MMSG.

15. A non-transitory, signal-bearing storage medium tangibly embodying a program of machine-readable instructions executable by a digital processing apparatus to perform a method of relational learning, said machine-readable instructions comprising:

a precedence inclusion (PI) pattern learning module for generating a PI pattern of a learning sample wherein elements in said learning sample are machine-labeled to define a precedence relation and an inclusion relation; and a graphical user interface (GUI) to permit a user to provide inputs to define said PI pattern for each said learning sample; wherein said GUI comprises:

a first menu to permit the user to input a sample text, to select and designate argument names for linguistic elements from a selected sample text, and to construct a relation instance of said linguistic elements;

a second menu to permit the user to generate a PI pattern from one or more relation instances generated using said first menu; and a third menu to permit the user to use a PI pattern generated by said second menu to search for undiscovered instances of a relation instance.

16. The storage medium of claim 15, wherein said PI pattern learning module further calculates a Minimal Most Specific Generalization (MMSG) of all learning samples entered, said machine-readable instructions further comprising:

a PI application module for comparing unseen text with said learning samples, said comparing based on said MMSG.

* * * * *